(12) United States Patent
Wang et al.

(10) Patent No.: US 10,768,911 B2
(45) Date of Patent: Sep. 8, 2020

(54) MANAGING SOFTWARE COMPONENTS FOR SOFTWARE APPLICATION DEVELOPMENT

(71) Applicant: Accenture Global Solutions Limited, Dublin (IE)

(72) Inventors: Xiaoguang Wang, Shanghai (CN); Jun Zhang, Shanghai (CN)

(73) Assignee: Accenture Global Solutions Limited, Dublin (IE)

( * ) Notice: Subject to any disclaimer, the term of this patent is extended or adjusted under 35 U.S.C. 154(b) by 51 days.

(21) Appl. No.: 16/134,196

(22) Filed: Sep. 18, 2018

(65) Prior Publication Data

US 2020/0019387 A1    Jan. 16, 2020

(30) Foreign Application Priority Data

Jul. 11, 2018    (WO) ................. PCT/CN2018/095331

(51) Int. Cl.
*G06F 9/44* (2018.01)
*G06F 8/38* (2018.01)
*G06F 8/77* (2018.01)

(52) U.S. Cl.
CPC . *G06F 8/38* (2013.01); *G06F 8/77* (2013.01)

(58) Field of Classification Search
None
See application file for complete search history.

(56) References Cited

U.S. PATENT DOCUMENTS

| 2009/0100084 A1 | 4/2009 | Jayadevan et al. |
| 2010/0100868 A1 | 4/2010 | Shukla et al. |
| 2011/0088011 A1* | 4/2011 | Ouali ............... G06F 8/10 |
| | | 717/105 |

FOREIGN PATENT DOCUMENTS

| CN | 103631585 A | 3/2014 |
| CN | 105653260 A | 6/2016 |

OTHER PUBLICATIONS

International Search Report and Written Opinion for Application No. PCT/CN2018/095331, dated Apr. 11, 2019, 9 pages.

* cited by examiner

*Primary Examiner* — Anna C Deng
(74) *Attorney, Agent, or Firm* — Harrity & Harrity, LLP

(57) ABSTRACT

A device may receive first user input indicating creation of a first software component for inclusion in a first software application, the first software component being selected for creation in a first software framework associated with the first software application. The device may generate, based on the first software component, a second software component for inclusion in a second software application, the second software component being generated in a second software framework associated with the second software application. In addition, the device may cause display of the second software component in the second software application. The device may also provide component data to a second device, the component data defining at least one property associated with the first software component.

20 Claims, 8 Drawing Sheets

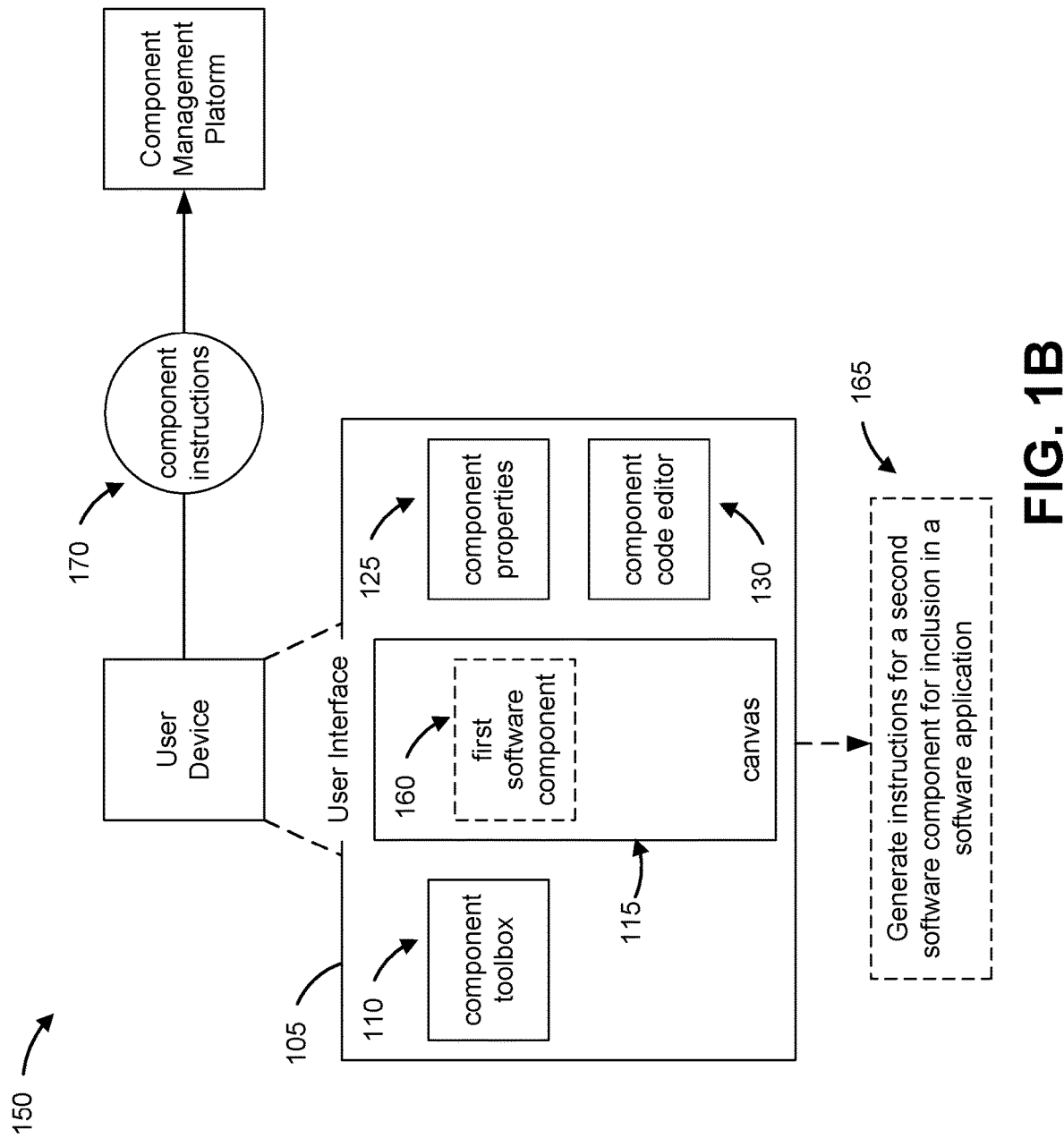

MANAGING SOFTWARE COMPONENTS FOR SOFTWARE APPLICATION DEVELOPMENT

CROSS-REFERENCE TO RELATED APPLICATION

This application claims priority under 35 U.S.C. § 119 to Patent Cooperation Treaty (PCT) Application No. PCT/CN2018/095331, filed Jul. 11, 2018, the contents of which are incorporated by reference herein.

BACKGROUND

The development of software applications for computing devices is often a time consuming and labor intensive process that requires special knowledge on the part of the individuals developing the software applications. The software development process is often further complicated in situations where software applications can be developed using multiple software frameworks, for multiple platforms, and in multiple programming languages.

SUMMARY

According to some implementations, a method may comprise: receiving, by a device, first user input indicating creation of a first software component for inclusion in a first software application, the first software component being selected for creation in a first software framework associated with the first software application; generating, by the device and based on the first software component, a second software component for inclusion in a second software application, the second software component being generated in a second software framework associated with the second software application; causing, by the device, display of the second software component in the second software application; and providing, by the device, component data to a second device, the component data defining at least one property associated with the first software component.

According to some implementations, a device may comprise: one or more memories; and one or more processors, communicatively coupled to the one or more memories, to: receive user input associated with a first software application; generate, based on the user input, first instructions for a first software component for inclusion in the first software application, the first instructions being in a first software framework associated with the first software application; identify a second software framework associated with a second software application; generate, based on the user input, second instructions for a second software component for inclusion in the second software application, the second instructions being in the second software framework; and provide the second instructions to a second device.

According to some implementations, a non-transitory computer-readable medium may store instructions, the instructions comprising: one or more instructions that, when executed by one or more processors, cause the one or more processors to: receive, from a first device, first instructions defining a software component for a first software application, the first instructions being in a first software framework; generate second instructions defining the software component in a second software framework; receive, from a second device, a request for the software component, the request being associated with a second software application in the second software framework; and provide the second device with data defining the software component in the second software framework.

BRIEF DESCRIPTION OF THE DRAWINGS

FIGS. 1A-1C are diagrams of an example implementation described herein.

DETAILED DESCRIPTION

Figure 1A:
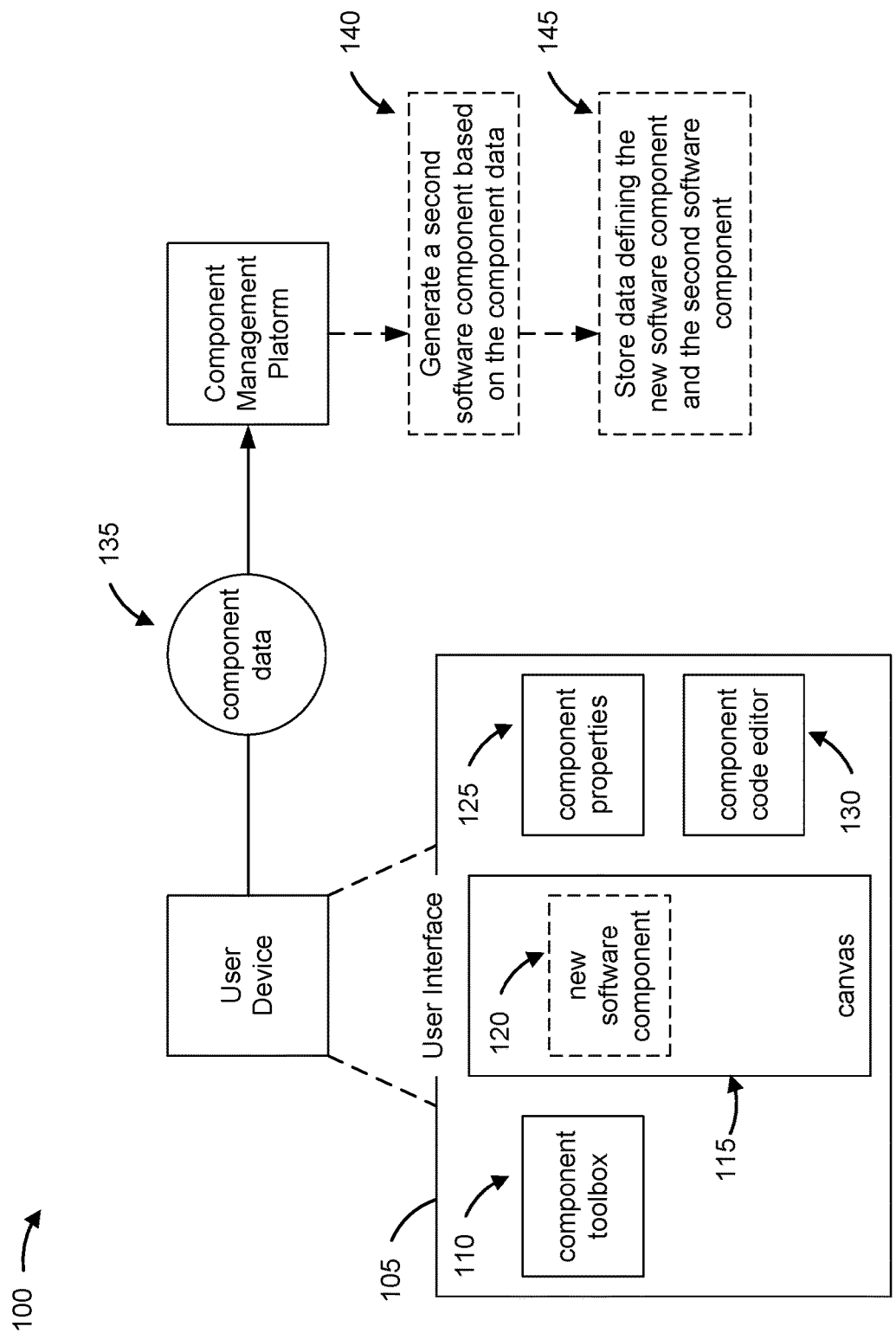

The following detailed description of example implementations refers to the accompanying drawings. The same reference numbers in different drawings may identify the same or similar elements.

Software applications are often developed by individuals through the use of another software application, such as an integrated development environment application, which may include a source code editor, debugger, and/or another tool or feature designed to make the development of software applications faster and/or easier. While some software applications and/or devices are capable of facilitating the development of software applications for multiple platforms (e.g., Windows, iOS, Android, web-based, and/or the like), a software developer generally requires special knowledge regarding software development, such as knowledge of the software framework and/or programming language in which a software application is to be developed.

A software framework provides a standard way to build and deploy applications. A software framework is a universal, reusable software environment that provides particular functionality as part of a larger software platform to facilitate development of software applications. Software frameworks may include support programs, compilers, code libraries, tool sets, and application programming interfaces (APIs) that enable development of a software application.

Some implementations, described herein, provide a user device and/or component management platform that is capable of facilitating the development of software applications through the use of a user interface designed to be simple to use, and re-usable software components (e.g., buttons, links, fields, graphics, and/or the like) that can be displayed in the user interface and generated in multiple different software frameworks and/or programming languages for a variety of platforms. For example, the component management platform may provide a first software application that includes a user interface through which a user can develop a second software application. The user may use features of the user interface to create software components that are displayed in the first software application (e.g., the UI) using a first programming language (e.g., hypertext markup language (HTML) or another programming language associated with the first software application) and generated in a first software framework (e.g., a software framework associated with the software application being developed). The user interface may include features, such as drag and drop operations for the creation of software components and selectable software component characteristics, to facilitate creation and customization of software components. In some implementations, the component management platform may store components that were previously generated by users, generate copies of software components in multiple software frameworks and/or for different platforms, and make software components available for users to include in software applications that are under development.

In this way, a user device and/or component management platform may facilitate the development of software applications in multiple software frameworks and for multiple platforms, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment (IDE), such as a web-based IDE that is accessible from any device with a web browsing application browser. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

Figure 1C:
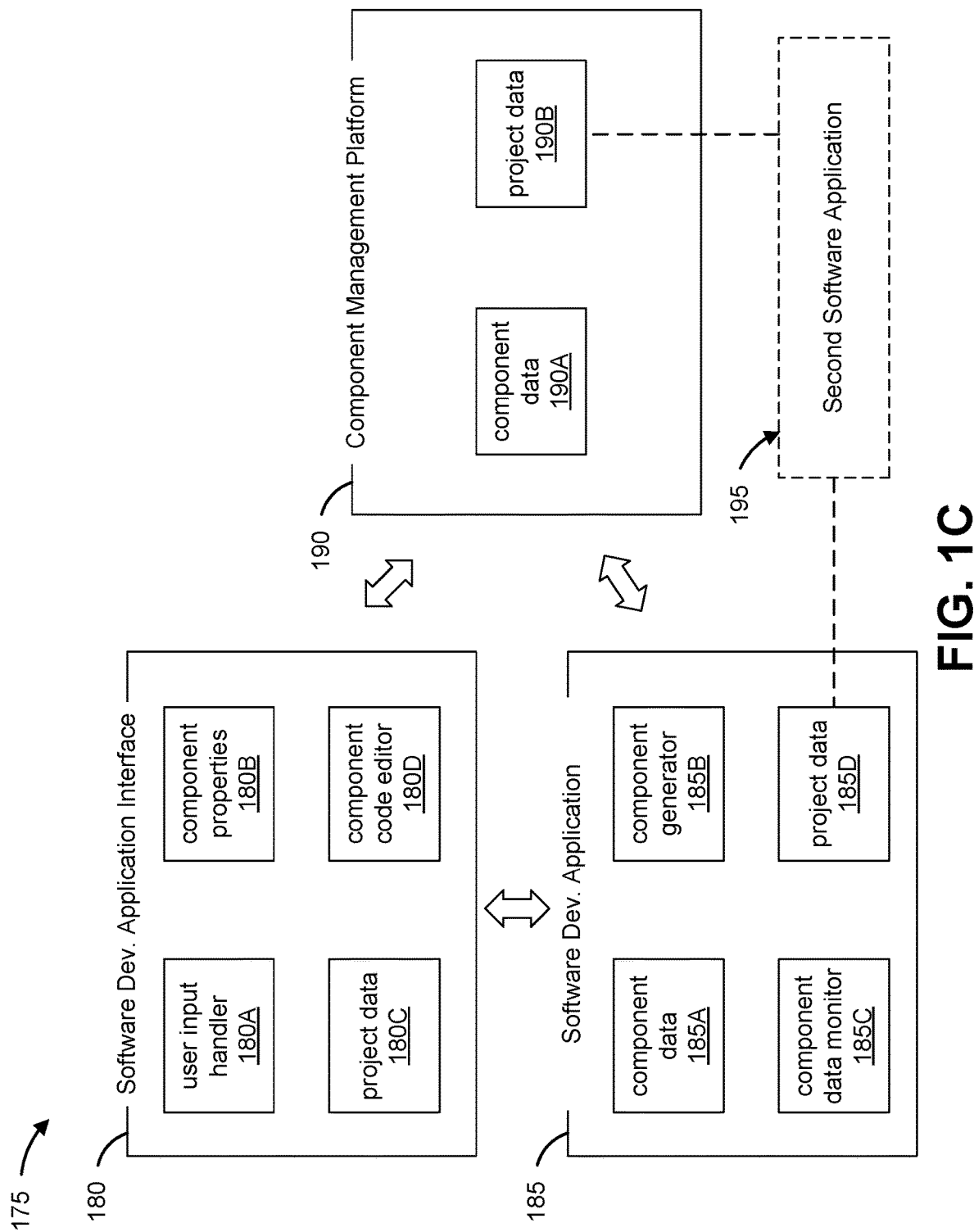

FIGS. 1A-1C are diagrams of example implementations described herein. As shown in FIG. 1A, example implementation 100 includes a user device (e.g., personal computer, tablet computer, mobile device, and/or the like), and a component management platform (e.g., a server computer, a cloud computing platform, and/or the like). While the devices of implementation 100 are depicted separately, in some implementations, the functionality of one or more of the devices of implementation 100 may be included in another device, or may be included in multiple, distributed devices. Implementation 100 depicts the creation of a new software component that can be used in the creation of a software application and/or re-used in the same software application and/or a different software application.

As shown by reference number 105, a software development application (e.g., an IDE) operating on the user device may include a user interface that enables a user of the user device to interact with various elements of the user interface to create software components and/or a software application. In some implementations, the software development application may be an application installed on and executed by the user device. In some implementations, the software development application may be a web-based application designed to execute a web application (e.g., an application operating on a server computer or the component management platform, and implemented in HTML, JavaScript, and/or the like). The software development application may be written in a variety of programming languages and provide a variety of different types of user interface elements, which may be used in the development of a new software component and/or another software application.

As shown by reference number 110, the example user interface of the software development application includes a component toolbox. The component toolbox may include one or more interactable user interface elements, such as buttons, which are associated with software components. For example, the component toolbox may include one or more buttons for the generation of software components, such as input components (e.g., buttons, checkboxes, drop-down lists, toggle buttons, text fields, and/or the like), navigational components (e.g., search fields, sliders, pagination indicators, links, icons, and/or the like), informational components (e.g., tooltips, progress bars, message boxes, images, and/or the like), and/or the like. In some implementations, the component toolbox may include user interface elements that generate a software component based on a pre-existing software component (e.g., a previously created software component). In some implementations, the component toolbox may include a user interface element designed to enable the creation of a new software component, which may enable a user of the user device to define a new type of software component.

As shown by reference number 115, the example user interface of the software development application includes a canvas. The canvas is designed to provide a visual representation of a portion of the software application under development. For example, for web application development, the canvas may depict what would typically be displayed (e.g., when viewed in a web browser) for a user of the web application being developed; for mobile application development (e.g., iOS, Android, and/or the like), the canvas may depict what would typically be displayed for a user of the mobile application being developed; for desktop application development, the canvas may depict what would typically be displayed for a user of the desktop application being developed.

In some implementations, the software development application may cause display, in the canvas, of the software components of the software application being developed. For example, the canvas may visually depict the software components of a web application, mobile application, desktop application, and/or the like. While the software application being developed may be for a variety of software platforms, in a variety of frameworks, and written in a variety of programming languages, the software components included in the canvas of the software development application may be created and/or generated in the software framework and/or programming language of the software development application. For example, in a situation where the software development application that provides the example user interface is written in HTML, the software components depicted in the canvas portion of the user interface may also be created/generated and displayed using HTML. In a situation where the software development application is being used for the development of a new software component, the type of new software component may be selected (e.g., from the component toolbox) by the user and visually represented in the canvas to facilitate further development of the new software component.

As shown by reference number 120, a new software component is visually represented in the canvas, e.g., in a manner designed to facilitate the development of the new software component by the user of the user device. The new software component may be represented in the canvas, for example, based on user input provided by the user (e.g., a selection of a new software component user interface element from the component toolbox). By way of example, the user may have used an input device (e.g., a computer mouse) to select a user interface element of the component toolbox, which may cause the creation of a new button in the canvas. The new software component (e.g., the button) may be created using software instructions associated with the software development application and the software framework associated with the application being developed. For example, based on user input indicating a new button is to be created, the user device (e.g., via the software development application) may use previously stored HTML code to cause display of a new button in the canvas (e.g., in HTML). The code for creating a new software component may be stored, for example as a template. In the foregoing example, the new button may be created and displayed using an HTML template for a button in a particular software framework, which may then be customized as described in further detail below.

As shown by reference number 125, the example user interface of the software development application includes a component properties user interface element. The component properties user interface element, or panel, may provide the user with a variety of customizable characteristics (e.g., metadata) associated with the new software component being created. For example, using the button example above, the component properties user interface element may display various characteristics associated with the button, such as a graphic associated with the button, text associated with the button, dimensions of the button, location of the button in the canvas, and/or the like. In some implementations, the component properties panel may include selectable characteristics, such as a search box, drop-down list, and/or the like, which enables a user to select a characteristic (e.g., a previously created characteristic) for the new software component, or a text field that enables the user to enter data for a characteristic (e.g., text to be displayed on the button). Changes that are made to the new software component by the use of other user interface elements (e.g., using user input and the canvas, the component code editor, and/or the like) may be updated and reflected in the component properties user interface element.

As shown by reference number 130, the example user interface of the software development application includes a component code editor user interface element. The component code editor user interface element, or panel, may provide the user with a way to input source code designed to alter the behavior of the new software component being developed. For example, the component code editor may enable the user to provide source code for events associated with the new software component, such as source code for an on-click event for a button software component, source code for an on-swipe event for a background software component, and/or the like. In some implementations, a template for a new software component may be associated with template source code, enabling the user to use common or previously created source code for new software components. For example, template source code associated with a button may include commonly used source code for buttons, such as an on-click event handler, which may be provided to the user in a manner designed to obviate the need to the user to re-create software components and corresponding metadata and/or functionality, and/or have special knowledge regarding the implementation of an on-click event for the button.

In some implementations, the user device (e.g., via software development application) may normalize source code associated with the new software component in a manner designed to ensure that the source code conforms to a standard. For example, the software development application may include or otherwise have access to a source code parsing and normalization engine, or module, designed to format and style source code in a predetermined manner. Normalization of source code may facilitate the creation of new software components in a uniform manner, in a manner designed to ensure ease of use when generating software components based on the new software component.

The example user interface and example user interface elements are merely examples, and the user interface of the software development application may take a variety of forms and be implemented in a variety of programming languages. For example, any functionality described as being provided by any of the user interface elements described above may be provided by another user interface element or elements. Additional or alternative user interface elements may be used and/or combined with any of the example user interface elements described above. A variety of different forms of user input may be handled by the software development application (e.g., enabling a variety of different types of interactions with the user interface), including drag and drop input, swipe input, textual input, voice input, and/or the like. As described below, the functionality provided by the software development application may be implemented in the user device or in the component management platform (e.g., in a cloud-based solution).

As shown by reference number 135, the user device provides component data to the component management platform. The component data may include information used to define the new software component (e.g., new software component 120), such as the instructions used to display the new software component (e.g., the HTML, instructions, or other instructions, associated with the new software component), data identifying the type of software component (e.g., a button), the characteristics of the new software component (e.g., as defined using the component properties user interface element), source code associated with the new software component (e.g., as defined using the component code editor user interface element), software framework associated with the new software component (e.g., Bootstrap, Foundation, Semantic UI, Pure, Wechat, and/or the like), and/or the like. In some implementations, the component data may also include additional information associated with the new software component, such as information identifying a project associated with the new software component (e.g., a software application under development, and in which the new software component is to be used), information identifying a user account associated with the user device and/or software component (e.g., to enable user account related functionality associated with the component management platform), information identifying whether the new software component is to be shared (e.g., publicly, privately, and/or the like), and/or other information that might be relevant to the new software component.

As shown by reference number 140, the component management platform generates a second software component based on the component data. The component management platform generates the second software component in a software framework that is different from the software framework in which the new software component was generated. For example, in a situation where the new software component was generated for the Bootstrap framework, the second software component may be generated in any software framework other than Bootstrap (e.g., Foundation, Semantic UI, Pure, Wechat, and/or the like). The second software component is generated in a manner designed to cause the second software component to be similar to, or the same as, the new software component. By way of example, using the HTML, button example software component, the component management platform may obtain information that defines the button from the component data and use the information to generate a second version of the same button, but for a different software framework.

The component management platform may generate the second software component in a variety of ways. In some implementations, the component management platform may generate the second software component based on information included in the component data associated with the new software component. For example, the new software component may include or otherwise be associated with information designed to facilitate the creation of additional software components for another software framework, e.g., by identifying various characteristics of the new software component in a predefined manner. In this situation, the component data associated with the new software component may include information specifying characteristics of the new software component, such as size, shape, position, color, associated text, associated events, and/or the like. The information specifying the characteristics of the new software component may be obtained by the component management platform in a variety of ways.

By way of example, using the HTML, button example software component, when creating the button, the software development application may include, in the HTML code that defines the button and causes the button to display in the software development application (e.g., the HTML code that causes the button to display on the canvas), special HTML tags that provide no functionality for the button but specify various characteristics of the button. In this situation, a special HTML tag may appear as follows: <special tag> information specifying characteristics of the button </special tag>. The software development application may create the special tags, and the information that goes in the special tags, as the button is created. As changes to the button are made (e.g., via user input, changes may be made to the size, shape, position, color, text, and/or the like), the software development application may update the information included in the special tags to reflect the changes. By way of example, a Bootstrap button may be defined by the following instructions: <button class="btn btn-primary">{meta-data-text}</button>. When the component data defining the button is provided to the component management platform, the component data may include the information in the special tags.

The component management platform may use the information included in the component data to generate the second software component. As noted above, the second software component is designed to be similar to the new software component, but in a different software framework. In some implementations, the component management platform may include or otherwise have access to a data structure (e.g., a database) that stores instructions (e.g., source code) for a variety of different software components and characteristics, and in a variety of software frameworks and/or programming languages. By way of example, using the HTML button example software component and corresponding special tags, the component management platform may identify the type of software component (e.g., a button) and obtain, from the data structure, instructions to create a button in another software framework. For example, a Wechat button, generated based on the example Bootstrap button above, may be defined by the following instructions: <webutton class="btn btn-primary">{meta-data-text}</webutton>. For each characteristic included in the special tags associated with the button (e.g., the meta-data-text), the component management platform may obtain, from the data structure (or a separate data structure or structures) corresponding instructions to apply the characteristic to the button in the second software framework. For example, in a situation where the button includes special tags identifying the size, shape, position, color, and text of the button, the component management platform may obtain, from the data structure, instructions that causes creation of a button (in the second software framework) with the same size, shape, position, color, and text.

In implementations where the component management platform obtains instructions for generating the second software component from a data structure, the instructions may have been previously stored in the data structure(s) in a variety of ways. In some implementations, one or more software developers may provide instructions to the data structure, such as instructions defining templates for each type of software component in multiple software frameworks and/or programming languages and source code for various characteristics associated with the software components. In some implementations, the instructions for generating the second software component may have been previously stored in the data structure(s) by users of the user device (or other users of other user devices) and the software development application. Using the HTML, button example software component, the instructions to generate the second button (e.g., in a second software framework) may have been previously provided by another user that provided the instructions for creating a button in the second software framework. Similarly, the characteristics of the second button may have been provided by the same other user and/or other users that may have previously provided instructions for applying the various characteristics to a button in the second software framework, or instructions for applying the same characteristics to a different software component. In this way, the component management platform may have access to a variety of instructions for a variety of different software components and characteristics, which may be used to generate multiple software components for multiple software frameworks. By reusing these instructions, the user device and component management platform may conserve computing resources that would otherwise be wasted creating the instructions anew each time a software component was needed.

In some implementations, the component management platform may not have access to instructions, in the second software framework, for one or more characteristics associated with the new software component. This situation may arise, for example, in a situation where a particular software framework does not support a particular characteristic, or in a situation where instructions for a particular characteristic have not yet been provided to the component management platform (or a relevant data structure for storing component data). In this situation, the component management platform may generate the second software component without the instructions for the characteristics for which instructions are not available in the second software framework. A second software component generated without one or more characteristics may be incomplete but may still be useful to obviate the need for a user to provide source code for the generation of the second software component and/or some of the characteristics.

In some implementations, the component management platform may use user input to generate the second software component and/or characteristics for the second software component. For example, in a situation where instructions for generating the second software component, or one or more of the corresponding characteristics, are not available in the second software framework, the component management platform may prompt the user to provide instructions in the second software framework. In a situation where the user provides the instructions in the second software framework, the component management platform may use the provided instructions to generate the second software component.

In a situation where the user does not provide the instructions, the component management platform may attempt to obtain the instructions in another way (e.g., sending a notification to a software developer capable of providing the instructions), and/or notify the user that generation of the second software component, or one or more characteristics of the second software component, is not available. In some implementations, the component management platform may identify similar instructions and, based on the similarity of the instructions, provide the similar instructions to the user, e.g., with data enabling the user to complete the instructions in the second software framework.

In some implementations, the component management platform may generate, for the second software component, source code for events associated with the new software component (e.g., based on source code, generated by the software development application or provided by the user, for the new software component). The component management platform may identify the source code for the second software component in a manner similar to the manner in which the component management platform identified instructions for the second software component and corresponding characteristics (e.g., as described above). For example, in a situation where the user provided source code for the new software component, similar source code (e.g., for similar events, such as an on-click event for a button) may be identified from one or more data structures that store previously provided source code for components.

As shown by reference number 145, the component management platform stores data defining the new software component and the second software component. For example, the component management platform may store (e.g., in one or more data structures) instructions for generating the new software component (e.g., in the first software framework) and instructions for generating the second software component (e.g., in the second software framework). The component management platform stores the data defining the new software component and the second software component to facilitate the retrieval and re-use of the software components in the future development of software applications. The ability to re-use software components may significantly decrease the human and computing resources used in software application development, e.g., by obviating the need for users to have special software framework knowledge, and obviating the need to re-create software components that may have already been created.

In some implementations, component data provided to the component management platform indicates whether the new software component is public or private. For public software components, the component management platform may store instructions for generating the new software component in a manner designed to make the instructions publicly available to all users of the component management platform. The component management platform may, in some implementations, concurrently interact with tens of user devices, hundreds of user devices, or more, at any given time, enabling the creation of a large library, or marketplace, of software components which may be freely provided to other users or sold for profit. For example, a user may monetize the user's software development skills by creating re-usable software components and making them available (e.g., for free, or for a fee) on a marketplace of software components that may be provided by the component management platform. For private software components, a variety of restrictions and controls may be placed on the new software component that limit the users to whom the instructions for generating the new software component will be made available. For example, a private software component may be private for use by a particular user, for use in a particular software application project, for use by a particular organization, for use by a particular subset of users, and/or the like. In some implementations, portions of the new software component may be public, while other portions may be private (and/or varying types of private). For example, a user may indicate, in the component data, that a general template for the new software component may be made public, while the characteristics of the new software component should be accessible only to users associated with the same organization as the user, and the source code for events associated with the new software component should be private to a particular software application.

In some implementations, the component management platform may store source code, or instructions, for entire software applications, and not only for separate software components. For example, the component management platform may include or otherwise have access to a data structure that is a repository for source code for the development of a software application. In this situation, software components that are created by users may be associated with source code for a software application that may make use of the software components. Using the HTML, button example software component above, the user of the user device may have created the button for inclusion in a software application for which the component management platform stores the source code. In this situation, in addition to storing the new software component and/or second software component in a data structure to be shared with other users and/or re-used by the user, the component management platform may store, in the source code for the software application under development, the version of the software component that corresponds to the software framework of the software application.

In this way, the user device and component management platform may facilitate the creation of software components that can be re-used by those who created the software components as well as other users. The re-usable software components may be re-used in software applications that are written in a variety of software frameworks, written for a variety of platforms, and written using a variety of programming languages.

As noted above, at least a portion of the functionality described as being performed by the component management platform may be performed by the user device, and at least a portion of the functionality described as being performed by the user device may be performed by the component management platform. For example, in some implementations, the user device may generate the second software component based on the data defining the new software component, and the component management platform may be used for storage (e.g., of software components and software application source code). As another example, the component management platform may provide the functionality described above, with the user device acting as a terminal that makes use of the resources provided by the component management platform. The re-use of components created in a manner similar to that described above is described in further detail, below.

As shown in FIG. 1B, example implementation 150 includes a user device (e.g., the same user device or a different user device than the user device depicted in implementation 100), and the component management platform (e.g., the same component management platform or a different component management platform than the component management platform depicted in implementation 100). Implementation 150 depicts the generation of a software component based on a user's selection of a software component using a user interface. For example, software components that were created in implementation 100 may be re-used, as shown in implementation 150.

The user device depicted in the example implementation 150 includes a software development application that may be the same as or similar to the software development application described above with reference to FIG. 1A. In example implementation 150, the software development application includes a user interface 105 and additional user interface elements that are the same as those described above, with reference to FIG. 1A, such as the component toolbox 110, canvas 115 user interface element, component properties 125 user interface element, and component code editor 130 user interface element. However, in example implementation 150, the user interface 105 and the included elements are depicted as being used for the generation of a software component based on a previously generated software component. The software component being generated, or re-used, is to be generated in the software framework and programming language that is associated with the user's software project, or application.

As shown by reference number 160, the canvas includes a first software component. The first software component is a software component generated based on user input (e.g., in a manner similar to the creation of a new software component, as described above with reference to FIG. 1A). For example, based on user input selecting the generation of a software component from the component toolbox, the software development application may place the first software component on the canvas. By way of example, a user of the user device may be developing a mobile application (e.g., a software application designed to be used on mobile devices). By selecting a software component, such as a button, from the component toolbox, the software development application causes an HTML, version of the software component to be displayed on the canvas in the software framework associated with the user's project, or application. The properties of the first software component may be displayed in the component properties user interface element (e.g., with one or more selectable characteristics that may be applied to the button), and the component code editor may provide source code to facilitate the creation of events associated with the first software component (e.g., an employ on-click method may be included by default, to enable the user to define on-click events associated with the button).

In some implementations, the software development application may accept, as user input, a query (e.g., vocal query, text-based query, and/or the like), and identify a software component to be generated based on the query. For example, in a situation where a user wants to add a component, but is not sure which type to add, the user may provide a query for a type of component, be presented with available software components, and make a selection of a software component to be generated for the user's software development project.

In some implementations, multiple versions of a particular type of software component may be available for re-use. In this situation, the software development application may provide (e.g., in the component toolbox) a user interface element enabling selection of a particular type of software component. For example, for a button, the software development application may be capable of generating, or re-using, buttons with different shapes, sizes, colors, events, and/or the like. The first software component may be a selection of a button from multiple different types of buttons. In some implementations, the characteristics of the first software component may be customized after their generation. For example, the color of a button may be changed using the color characteristic in the component properties panel, and/or the functionality of an on-click event for the button may be changed using the component code editor.

As shown by reference number 165, the user device generates instructions for a second software component for inclusion in a software application (e.g., the mobile application being developed by the user). The instructions for the second software component may be associated with a software framework that is different from the software framework used to generate the first software component. For example, in a situation where the first software component was generated in the software development application in Bootstrap, the second software component may be generated in a non-Bootstrap framework. In the mobile application example, the second software component may be generated in a software framework associated with the mobile application (e.g., as previously determined based on user settings).

The user device may generate the instructions for the second software component in a manner similar to that described above with reference to FIG. 1A. For example, the user device (e.g., via the software development application) may include or otherwise have access to a data structure that stores software components that were previously created (e.g., in a manner similar to that described above with reference to FIG. 1A). Based on component data associated with the first software component, such as special HTML, tags that define various characteristics of the first software component, the user device may obtain (e.g., from the data structure) the instructions for generation of the second software component, generating a copy of the instructions for use in the development of the software application (e.g., the mobile application).

In some implementations, instructions for multiple software components may be generated for inclusion in multiple software applications. For example, mobile applications are often developed for multiple platforms (e.g., iOS, Android, and/or the like) and in multiple languages. In a situation where the user is developing multiple mobile applications (e.g., a mobile application for each mobile platform), the user may wish to develop a mobile application for multiple platforms, each of which may use a separate software platform and/or programming language. In this situation, instructions for multiple software components may be generated by the user device, e.g., for inclusion in the source code of the mobile applications being developed by the user.

The first software component (and corresponding second software component) may be associated with a variety of characteristics. For example, depending on the manner in which the first software component and/or second software component was previously stored and generated for re-use, the instructions for generating the software components may include data defining various characteristics. As noted above, the user may change the characteristics of the first software component in the software development application (e.g., the HTML, version of the software component). In this situation, the user device (e.g., via the software development application) may update the instructions for the corresponding second software component to reflect the changed characteristic(s).

By generating instructions for the second software component, the user device enables the user to obtain a software component designed to be used in the software application being developed by the user without requiring recreation and/or reprogramming a software component multiple times. By using the user interface of the software development application, the user can generate the source code for the user's software application using simple user input commands, obviating the need to create the source code for the second software component from nothing.

As shown by reference number 170, the user device provides component instructions to the component management platform. The component instructions may include a variety of information regarding the first software component and the second software component, including the instructions that define the second software component. In this example, providing the component instructions to the component management platform enables the component management platform to store the component instructions in the source code of the application being developed by the user of the user device. In some implementations, the component instructions may be stored in a manner similar to that described above with reference to FIG. 1A. In this situation, the component instructions may also be stored in a manner designed to enable the component instructions to be re-used (e.g., in the same software application or a different software application). Additionally, or alternatively, the component instructions may enable multiple user devices to develop the corresponding software application by communicating with the component management platform to obtain the source code for the software application (e.g., in a manner similar to a source code repository).

As noted above, at least a portion of the functionality described as being performed by the component management platform may be performed by the user device, and at least a portion of the functionality described as being performed by the user device may be performed by the component management platform. For example, in some implementations, the component management platform may generate the instructions for the second software component for the user device. Other configurations are also possible, and additional implementations are described below, e.g., with respect to FIG. 1C.

As shown in FIG. 1C, example implementation 175 includes a functional block diagram depicting modules (e.g., software, hardware, or a combination thereof) of a software development application (e.g., a software application used to develop a second software application). The software development application may be executed, for example, by a user device (e.g., a user device depicted in example implementation 100 and/or 150). The example implementation 175 also depicts modules of the component management platform (e.g., a component management platform depicted in example implementation 100 and/or 150). While much of the functionality and features provided by the modules of both the software development application and component management platform have been described above (e.g., with reference to FIGS. 1A and 1B), some additional functionality and features are described with respect to the example implementation 175.

As shown by reference number 180, the software development application interface (e.g., the portions of the application designed to be visible to the user) includes a variety of modules designed to facilitate the development of software components and applications. For example, the user input handler 180A module may include instructions enabling the software development application to receive user input from a user in a variety of ways, such as drag and drop commands, swiping commands, textual input, voice input, and/or the like. The component properties 180B module and component code editor 180D modules provide functionality similar to that describe above with respect to the component properties user interface element and component code editor user interface element. The project data 180C module stores source code (e.g., instructions) for a software application under development (e.g., the second software application). The source code, and other files and resources relevant to the software application being developed, may be accessible to the user through the user interface of the software development application.

As shown by reference number 185, the software development application (e.g., the portions of the application designed to operate without direct user action or input via the user interface) includes a variety of modules designed to facilitate the development of software components and applications. For example, the component data 185A module may include all of the instructions and related information stored for software components, enabling retrieval of the instructions and related information for re-using the software components. Component generator 185B module may provide the functionality for generating software components (e.g., both generating different versions of software components during component creation, and generating a version of a software component designed to be used by the software application being developed). The component data monitor 185C module is designed to monitor for changes to the instructions for component generation (e.g., monitoring data structure in which software component instructions are stored for changes, and updating software components accordingly). The project data 185D module, similar to the project data 180C module, stores source code for the software application under development. In some implementations, the project data module 185D and project data module 180C may be implemented in the same module.

As shown by reference number 190, the component management platform includes two modules: a component data 190A module and a project data 190B module. The component data 190A module stores information related to software components, including instructions to generate the software components in a variety of languages. The project data 190B module, similar to project data modules described above, stores source code for the software application under development.

As shown by reference number 195, the second software application is stored in the project data modules, both by the user device (e.g., via the software development application) and the component management platform. The second software application is the application being developed by a user through the use of the software development application.

By way of example, during operation, a user may provide user input (e.g., via user input handler 180A) to generate a software component. This may generate an HTML, version of the software component in the interface of the software development application and in a first software framework, but also trigger creation of at least one other version of the software component (e.g., in a different software framework) in the software development application (e.g., using the component data 185A module and component generator 185B module). The user may edit the properties of the HTML version of the software component in the software development application interface (e.g., via component properties 180B module and/or component code editor 180D module). Any changes to the properties of the HTML version of the software component may be communicated to the the software development application for application to the other version of the software component. Project data defining the software application for which the software component is being generated is stored and updated in project data (e.g., visible to the user in project data 180C module and in the project data 185D module). The component data monitor 185C module is designed to periodically check with the component management platform to determine whether changes have been made to software component templates, in which case the instructions should be updated in the project data for the software application under development. Communication may also take place with the component management platform to update component templates, if applicable, and to store source code for the project.

The modules depicted in the example implementation are merely an example for illustrative purposes. Additional and/or different modules may be used and/or combined with the modules depicted in the example. For example, a software execution module (e.g., designed to execute software instructions, with or without the use of an emulator, for the purpose of testing a software application in development), or software deployment module (e.g., designed to deploy a software application to a particular environment) may be included in the software development application and/or component management platform. As discussed above (e.g., with reference to FIGS. 1A and 1B), the functionality provided by the user device (e.g., via the software development application) and the component management platform may vary.

In this way, a user device and/or component management platform may facilitate the development of software applications in multiple software frameworks and for multiple platforms, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment (IDE), such as a web-based IDE that is accessible from any device with a web browsing application browser. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

As indicated above, FIGS. 1A-1C are provided merely as examples. Other examples are possible and may differ from what was described with regard to FIGS. 1A-1C.

Figure 2:
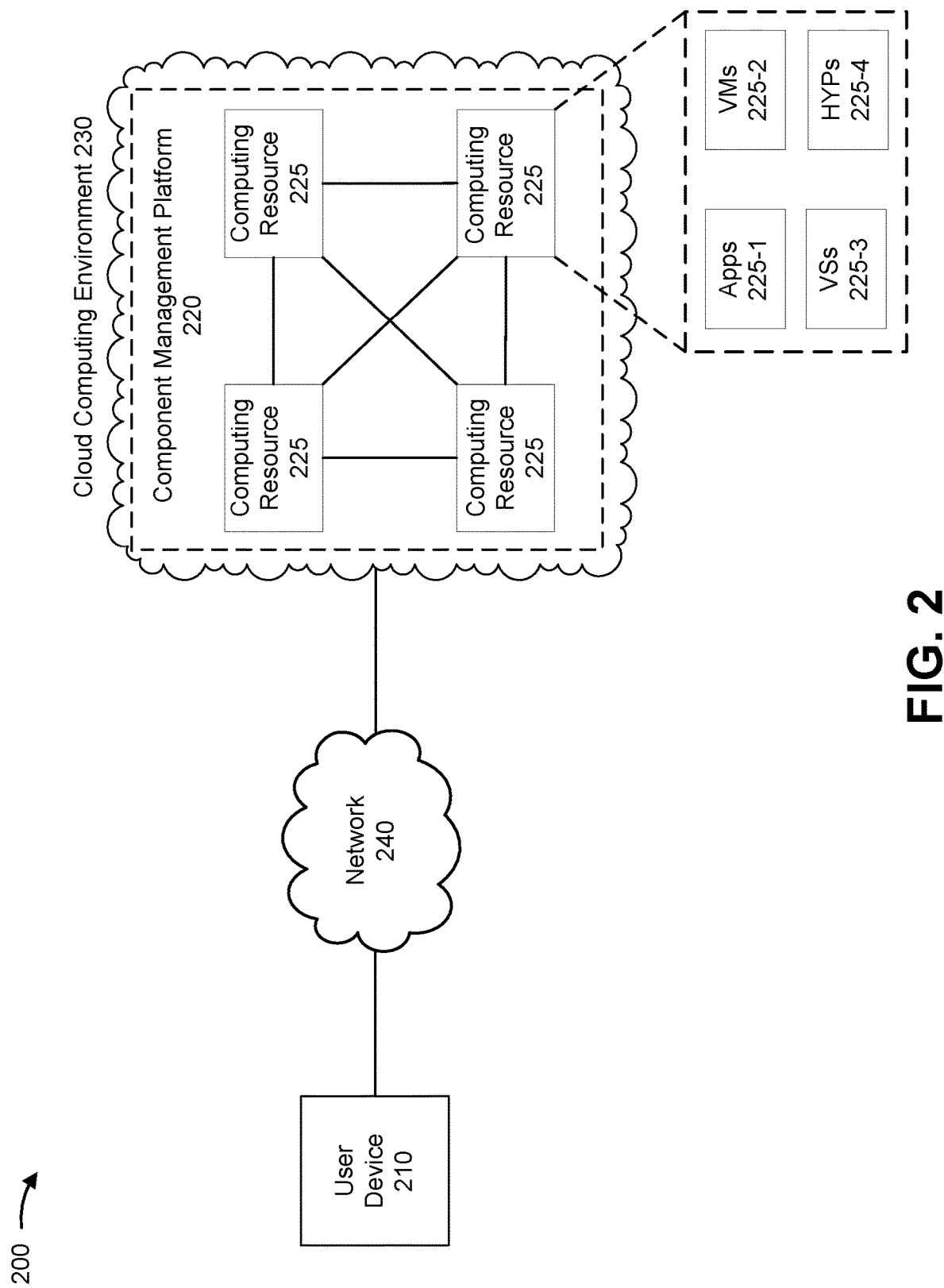
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a component management platform 220, a computing resource 225, a cloud computing environment 230, and a network 240. Devices of environment 200 may interconnect via wired connections, wireless connections, or a combination of wired and wireless connections.

User device 210 includes one or more devices capable of receiving, generating, storing, processing, and/or providing information associated with software components. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may be capable of communicating with component management platform 220 to create and re-use software components in multiple software frameworks.

Component management platform 220 includes one or more devices capable of receiving, generating, storing, processing, and/or providing information associated with software components and the development of software applications. For example, component management platform 220 may include a server device (e.g., a host server, a web server, an application server, etc.), a data center device, or a similar device. For example, component management platform 220 may be capable of generating multiple versions of a software component in different software frameworks, providing user device 210 with access to software components, and storing source code for software development projects.

In some implementations, as shown, component management platform 220 may be hosted in cloud computing environment 230. Notably, while implementations described herein describe component management platform 220 as being hosted in cloud computing environment 230, in some implementations, component management platform 220 might not be cloud-based (i.e., may be implemented outside of a cloud computing environment 230) or might be partially cloud-based.

Cloud computing environment 230 includes an environment that delivers computing as a service, whereby shared resources, services, etc. may be provided to user device 210 and/or component management platform 220. Cloud computing environment 230 may provide computation, software, data access, storage, and/or other services that do not require end-user knowledge of a physical location and configuration of a system and/or a device that delivers the services. As shown, cloud computing environment 230 may include component management platform 220 and computing resource 225.

Computing resource 225 includes one or more personal computers, workstation computers, server devices, or another type of computation and/or communication device. In some implementations, computing resource 225 may host component management platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210. Application 225-1 may eliminate a need to install and execute the software applications on user device 210. For example, application 225-1 may include software associated with component management platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program and may support a single process. In some implementations, virtual machine 225-2 may execute on behalf of a user (e.g., user device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
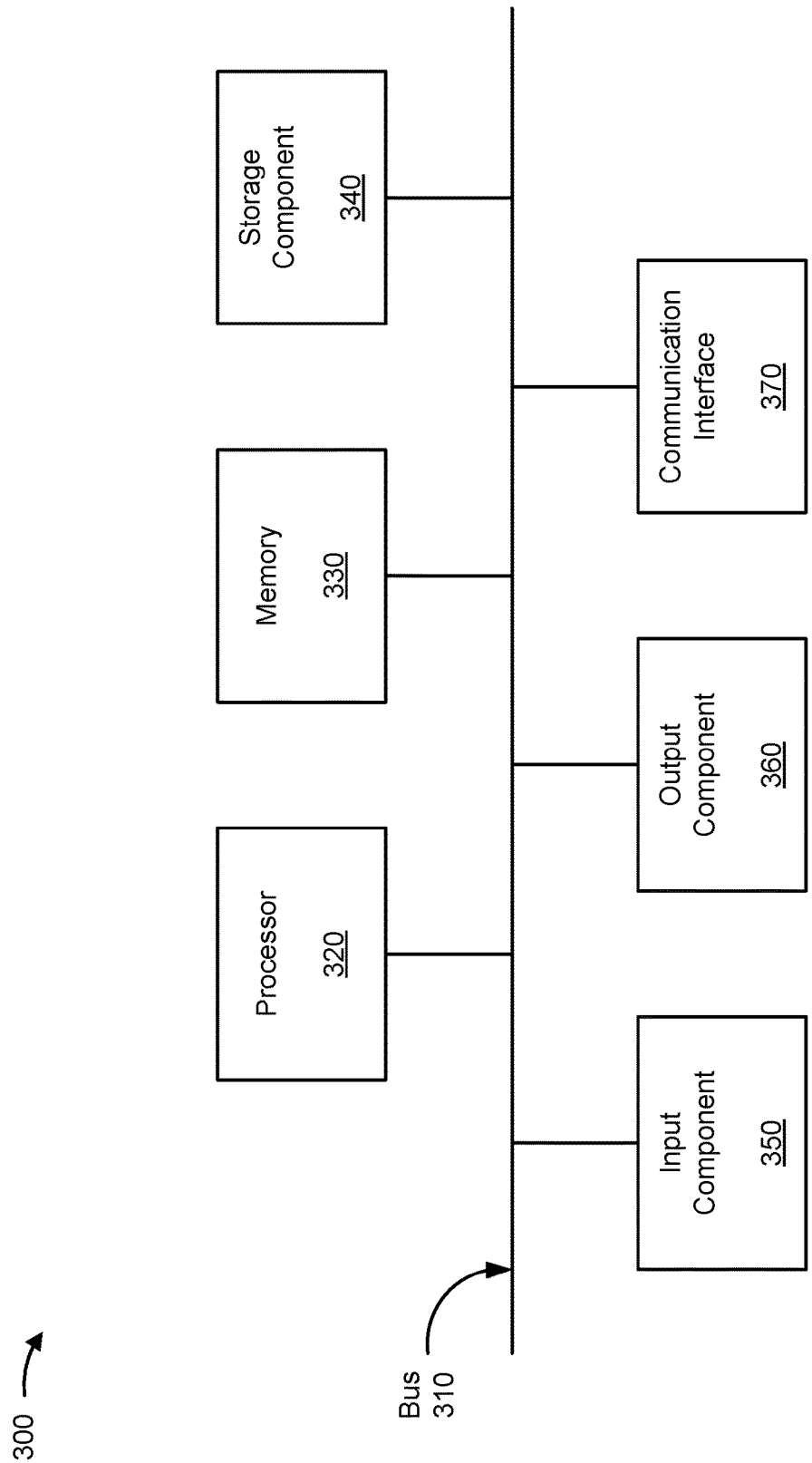
FIG. 3 is a diagram of example components of one or more devices of FIG. 2.

FIG. 3 is a diagram of example components of a device 300. Device 300 may correspond to user device 210, component management platform 220, and/or computing resource 225. In some implementations, user device 210, component management platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
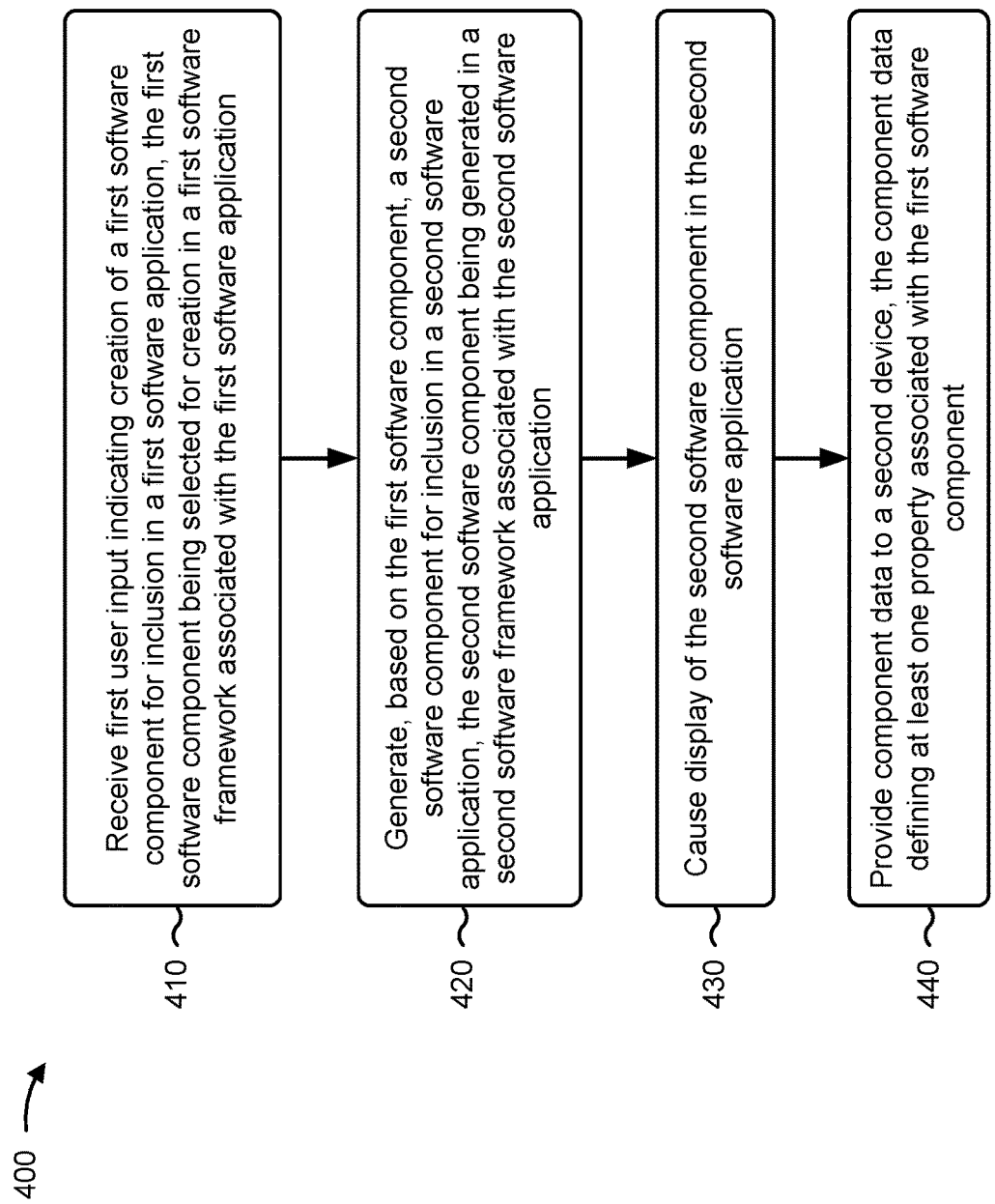
FIGS. 4-6 are flow charts of example processes for managing software components for software application development.

FIG. 4 is a flow chart of an example process 400 for managing software components for software application development. In some implementations, one or more process blocks of FIG. 4 may be performed by a user device (e.g., user device 210). In some implementations, one or more process blocks of FIG. 4 may be performed by another device or a group of devices separate from or including the user device, such as a component management platform (e.g. component management platform 220), and/or a computing resource (e.g. computing resource 225).

As shown in FIG. 4, process 400 may include receiving first user input indicating creation of a first software component for inclusion in a first software application, the first software component being selected for creation in a first software framework associated with the first software application (block 410). For example, the user device (e.g., using computing resource 225, processor 320, memory 330, storage component 340, input component 350, communications interface 370, and/or the like) may receive first user input indicating creation of a first software component for inclusion in a first software application, as described above in connection with FIGS. 1A-1C. In some implementations, the first software component is selected for creation in a first software framework associated with the first software application.

As further shown in FIG. 4, process 400 may include generating, based on the first software component, a second software component for inclusion in a second software application, the second software component being generated in a second software framework associated with the second software application (block 420). For example, the user device (e.g., using computing resource 223, processor 320, memory 330, storage component 340, input component 350, output component 360, communications interface 370, and/or the like) may generate, based on the first software component, a second software component for inclusion in a second software application, as described above in connection with FIGS. 1A-1C. In some implementations, the second software component is generated in a second software framework associated with the second software application.

As further shown in FIG. 4, process 400 may include causing display of the second software component in the second software application (block 430). For example, the user device (e.g., using computing resource 223, processor 320, memory 330, storage component 340, output component 360, communications interface 370, and/or the like) may cause display of the second software component in the second software application, as described above in connection with FIGS. 1A-1C.

As further shown in FIG. 4, process 400 may include providing component data to a second device, the component data defining at least one property associated with the first software component (block 440). For example, the user device (e.g., using computing resource 223, processor 320, memory 330, storage component 340, output component 360, communications interface 370, and/or the like) may provide component data to a second device, the component data defining at least one property associated with the first software component, as described above in connection with FIGS. 1A-1C.

Process 400 may include additional implementations, such as any single implementation or any combination of implementations described below and/or in connection with one or more other processes described elsewhere herein.

In some implementations, the second software application includes a development environment to develop software applications. In some implementations, the first software application includes an application under development for a plurality of other devices.

In some implementations, the process 400 may include providing the second device with a request for data associated with the first software application and receiving, from the second device, the component data.

In some implementations, the first software framework is different from the second software framework. In some implementations, the second software framework includes hypertext markup language (HTML). In some implementations, generating the second software component for inclusion in the second software application includes generating HTML tags that cause the second software component to display in the second software application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
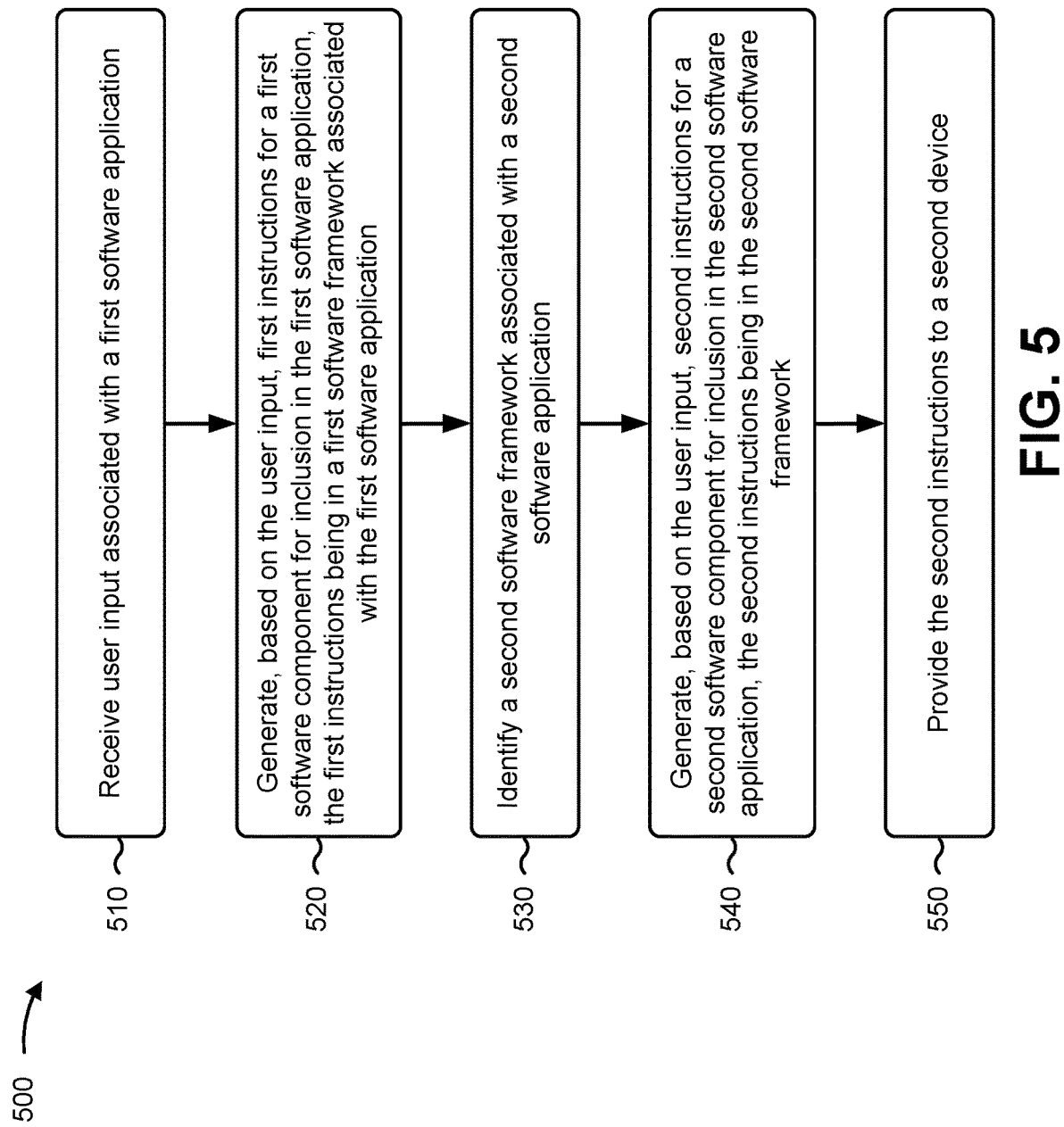

FIG. 5 is a flow chart of an example process 500 for managing software components for software application development. In some implementations, one or more process blocks of FIG. 5 may be performed by a user device (e.g., user device 210). In some implementations, one or more process blocks of FIG. 5 may be performed by another device or a group of devices separate from or including the user device, such as a component management platform (e.g. component management platform 220), and/or a computing resource (e.g. computing resource 225).

As shown in FIG. 5, process 500 may include receiving user input associated with a first software application (block 510). For example, the user device (e.g., using computing resource 223, processor 320, memory 330, storage component 340, input component 350, communications interface 370, and/or the like) may receiving user input associated with a first software, as described above in connection with FIGS. 1A-1C.

As further shown in FIG. 5, process 500 may include generating, based on the user input, first instructions for a first software component for inclusion in the first software application, the first instructions being in a first software framework associated with the first software application (block 520). For example, the user device (e.g., using computing resource 223, processor 320, memory 330, storage component 340, input component 350, output component 360, communications interface 370, and/or the like) may generate based on the user input, first instructions for a first software component for inclusion in the first software application, as described above in connection with FIGS. 1A-1C. In some implementations, the first instructions are in a first software framework associated with the first software application.

As further shown in FIG. 5, process 500 may include identifying a second software framework associated with a second software application (block 530). For example, the user device (e.g., using computing resource 223, processor 320, memory 330, storage component 340, input component 350, output component 360, communications interface 370, and/or the like) may identify a second software framework associated with a second software application, as described above in connection with FIGS. 1A-1C.

As further shown in FIG. 5, process 500 may include generating, based on the user input, second instructions for a second software component for inclusion in the second software application, the second instructions being in the second software framework (block 540). For example, the user device (e.g., using computing resource 223, processor 320, memory 330, storage component 340, input component 350, output component 360, communications interface 370, and/or the like) may generate, based on the user input, second instructions for a second software component for inclusion in the second software application, as described above in connection with FIGS. 1A-1C. In some implementations, the second instructions are in the second software framework.

As further shown in FIG. 5, process 500 may include providing the second instructions to a second device (block 550). For example, the user device (e.g., using computing resource 223, processor 320, memory 330, storage component 340, output component 360, communications interface 370, and/or the like) may provide the second instructions to a second device, as described above in connection with FIGS. 1A-1C.

Process 500 may include additional implementations, such as any single implementation or any combination of implementations described below and/or in connection with one or more other processes described elsewhere herein.

In some implementations, the first instructions include hypertext markup language (HTML) instructions to display the first software component on a display of the device. In some implementations, the process 500 may include causing, based on the first instructions, display of the first software component on a display of the device. In some implementations, the user input includes a drag and drop interaction with the first software application.

In some implementations, the process 500 may include causing, based on the first instructions, display of a first user interface element in the first software application. The first user interface element may include selectable characteristics associated with the first software component. In some implementations, the process 500 may further include providing data defining characteristics associated with the second software component. The characteristics associated with the second software component may be based on second user input associated with the first user interface element.

In some implementations, the process 500 may include causing, based on the first instructions, display of a second user interface element in the first software application. The second user interface element may include at least one field for receiving custom instructions associated with the first software component. In some implementations, the process 500 may further include providing data defining custom instructions associated with the second software component. The custom instructions associated with the second software component may be based on third user input associated with the second user interface element.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
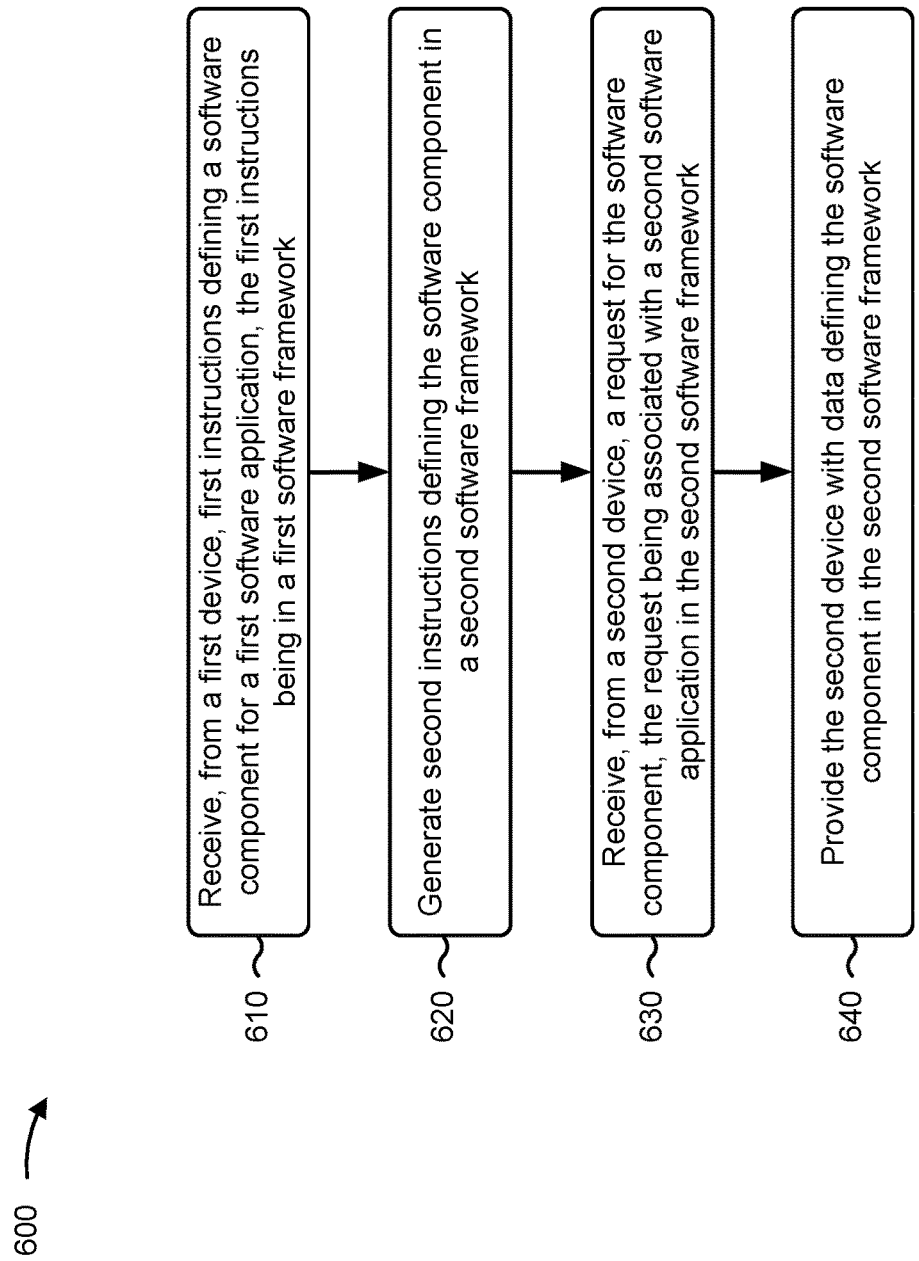

FIG. 6 is a flow chart of an example process 600 for managing software components for software application development. In some implementations, one or more process blocks of FIG. 6 may be performed by a component management platform (e.g. component management platform 220). In some implementations, one or more process blocks of FIG. 6 may be performed by another device or a group of devices separate from or including component management platform (e.g. component management platform 220), such as a user device (e.g. user device 210) and/or a computing resource (e.g. computing resource 225).

As shown in FIG. 6, process 600 may include receiving, from a first device, first instructions defining a software component for a first software application, the first instructions being in a first software framework (block 610). For example, the component management platform (e.g., using computing resource 223, processor 320, memory 330, storage component 340, input component 350, communications interface 370, and/or the like) may receive, from a first device, first instructions defining a software component for a first software application, the first instructions being in a first software framework, as described above in connection with FIGS. 1A-1C.

As further shown in FIG. 6, process 600 may include generating second instructions defining the software component in a second software framework (block 620). For example, the component management platform (e.g., using computing resource 225, processor 320, memory 330, storage component 340 and/or the like) may generate second instructions defining the software component in a second software framework, as described above in connection with FIGS. 1A-1C.

As further shown in FIG. 6, process 600 may include receiving, from a second device, a request for the software component, the request being associated with a second software application in the second software framework (block 630). For example, the component management platform (e.g., using computing resource 223, processor 320, memory 330, storage component 340, input component 350, communications interface 370, and/or the like) may receive, from a second device, a request for the software component, the request being associated with a second software application in the second software framework, as described above in connection with FIGS. 1A-1C.

As further shown in FIG. 6, process 600 may include providing the second device with data defining the software component in the second software framework (block 640). For example, the component management platform (e.g., using computing resource 223, processor 320, memory 330, storage component 340, output component 360, communications interface 370, and/or the like) may provide the second device with data defining the software component in the second software framework, as described above in connection with FIGS. 1A-1C.

Process 600 may include additional implementations, such as any single implementation or any combination of implementations described below and/or in connection with one or more other processes described elsewhere herein.

In some implementations, the first device is the second device. In some implementations, process 600 may further include storing, in a data structure and associated with the software component, the first instructions and the second instructions.

In some implementations, process 600 may further include storing the first instructions in a data structure associated with the first software application. In some implementations, the data structure associated with the first software application stores other instructions associated with the first software application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Using processes similar to those described above, a user device 210 and/or component management platform 220 may facilitate the development of software applications in multiple programming languages and frameworks and for multiple platforms, without requiring special knowledge on the part of a user, and in a manner designed to be relatively quick and efficient. Special programming knowledge and/or familiarity may not be required, for example, by using a user interface to enable the generation of software components in multiple languages, including languages with which a user might not be familiar. Reusable software components may significantly increase the speed and efficiency of software development, including facilitating more efficient use of software developer time and computing resources (e.g., processor resources, memory resources, and/or the like). Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create software components in multiple languages.

The foregoing disclosure provides illustration and description, but is not intended to be exhaustive or to limit the implementations to the precise form disclosed. Modifications and variations are possible in light of the above disclosure or may be acquired from practice of the implementations.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
providing, by a device, one or more user interface elements of a first software application:
receiving, by the device and based on the one or more user interface elements, first user input associated with the one or more user interface elements,
the first user input indicating creation of a first software component for inclusion in the first software application, and
the first software component being selected for creation in a first software framework associated with the first software application;
generating, by the device and based on the first software component and the first user input, a second software component for inclusion in a second software application, the second software component being generated in a second software framework associated with the second software application, the second software framework being different from the first software framework, and the second software component sharing a same component type as the first software component;

causing, by the device, display of the second software component in the second software application; and providing, by the device and based on the first user input, component data to a second device, the component data defining at least one property associated with the first software component.

2. The method of claim 1, wherein the second software application includes a development environment to develop software applications.

3. The method of claim 1, wherein the first software application includes an application under development for a plurality of other devices.

4. The method of claim 1, further comprising:
providing the second device with a request for data associated with the first software application; and
receiving, from the second device, the component data.

5. The method of claim 1, wherein the second software component includes hypertext markup language (HTML).

6. The method of claim 5, wherein generating the second software component for inclusion in the second software application comprises:
generating HTML tags that cause the second software component to display in the second software application.

7. The method of claim 1, further comprising:
causing display of a second user interface element in the first software application,
the second user interface element including at least one field for receiving custom instructions associated with the first software component.

8. A device comprising:
one or more memories; and
one or more processors, communicatively coupled to the one or more memories, to:
provide one or more user interface elements associated with a first software application;
receive, based on the one or more user interface elements, user input associated with the first software application, the user input indicating generation of a first software component in the first software application;
generate, based on the user input, first instructions for the first software component for inclusion in the first software application,
the first instructions being generated in a first software framework associated with the first software application;
identify a second software framework associated with a second software application;
generate, based on the user input, second instructions for a second software component for inclusion in the second software application,
the second instructions being generated in the second software framework associated with the second software application,
the second software framework being different from the first software framework, and
the second software component sharing a same component type as the first software component;
provide the second instructions to a second device; and provide data defining characteristics associated with the second software component to the second device,
the characteristics being associated with the second software component based on second user input associated with a first user interface element,
the first user interface element including selectable characteristics associated with the first software component.

9. The device of claim 8, wherein the first instructions include hypertext markup language (HTML) instructions to display the first software component on a display of the device.

10. The device of claim 8, wherein the one or more processors are further to:
cause, based on the first instructions, display of the first software component on a display of the device.

11. The device of claim 8, wherein the one or more processors are further to:
cause, based on the first instructions, display of the first user interface element in the first software application.

12. The device of claim 8, wherein the one or more processors are further to:
cause, based on the first instructions, display of a second user interface element in the first software application,
the second user interface element including at least one field for receiving custom instructions associated with the first software component.

13. The device of claim 12, wherein the one or more processors are further to:
provide data defining custom instructions associated with the second software component,
the custom instructions associated with the second software component being based on third user input associated with the second user interface element.

14. The device of claim 8, wherein the user input includes a drag and drop interaction with the first software application.

15. The device of claim 8, wherein the second software application includes an application under development for a plurality of other devices.

16. A non-transitory computer-readable medium storing instructions, the instructions comprising:
one or more instructions that, when executed by one or more processors, cause the one or more processors to:
provide one or more user interface elements associated with a first software application:
receive, from a first device and based on the one or more user interface elements, first instructions defining a software component for the first software application,
the first instructions being in a first software framework;
generate second instructions defining the software component in a second software framework,
wherein the second software framework is different from the first software framework, and
wherein the software component, as defined by the first instructions, shares a same component type as the software component defined by the second instructions;
receive, from a second device, a request for the software component,
the request being associated with a second software application in the second software framework;
provide the second device with the second instructions; and store, in a data structure associated with the software component, the first instructions and the second instructions.

17. The non-transitory computer-readable medium of claim 16, wherein the second device is the first device.

18. The non-transitory computer-readable medium of claim 16, wherein the one or more instructions, when executed by the one or more processors, further cause the one or more processors to:
store the first instructions in a data structure associated with the first software application.

19. The non-transitory computer-readable medium of claim 18, wherein the data structure associated with the first software application stores a plurality of other instructions associated with the first software application.

20. The non-transitory computer-readable medium of claim 16, wherein the second software application includes an application under development for a plurality of other devices.

\* \* \* \* \*